March 24, 1925.                                                1,530,527
G. N. SIMPSON
CAR DUMPER
Filed March 21, 1924            2 Sheets-Sheet 1
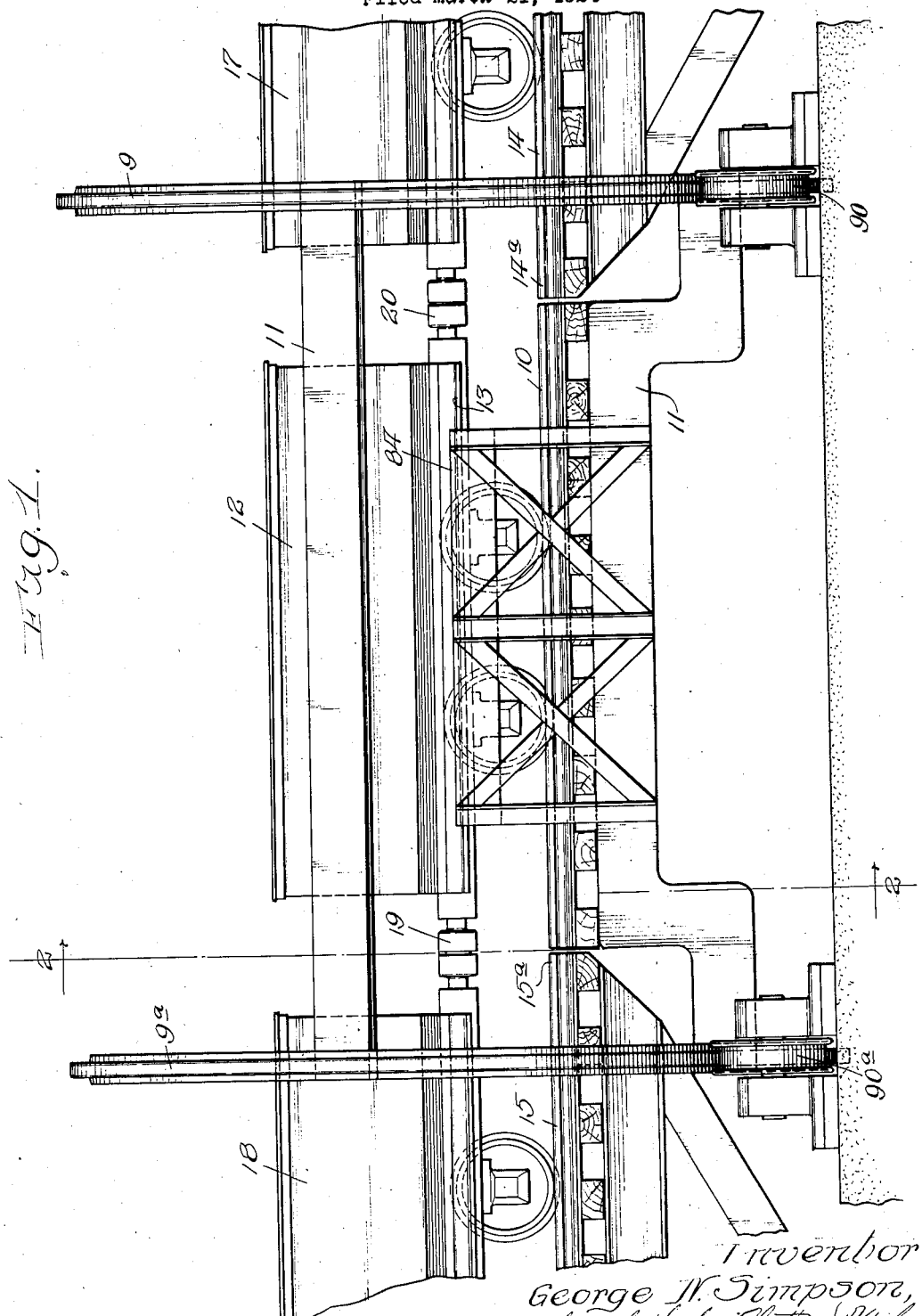

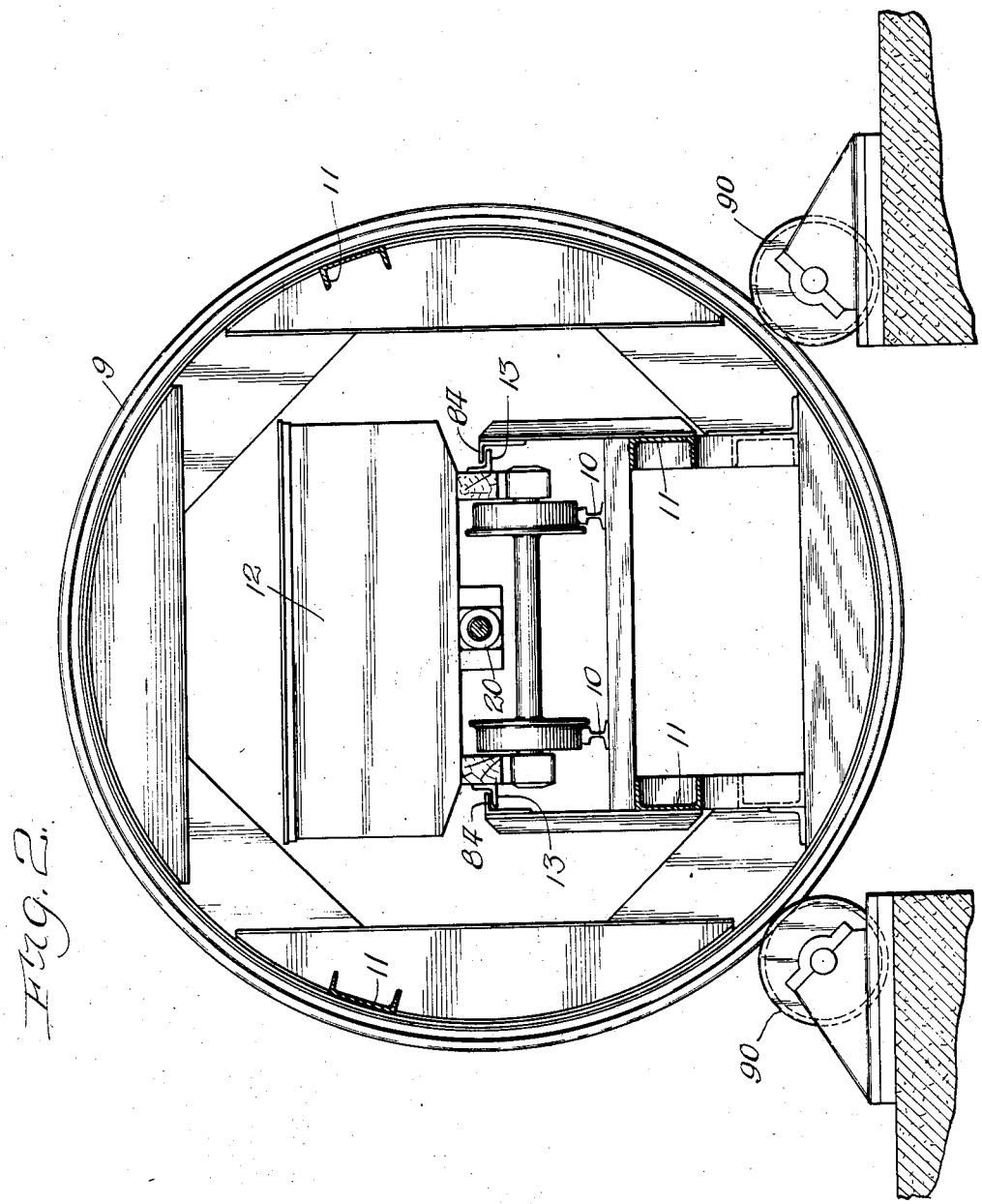

Patented Mar. 24, 1925.

1,530,527

UNITED STATES PATENT OFFICE.

GEORGE N. SIMPSON, OF CHICAGO, ILLINOIS.

CAR DUMPER.

Application filed March 21, 1924. Serial No. 700,881.

*To all whom it may concern:*

Be it known that I, GEORGE N. SIMPSON, a citizen of the United States, residing at 1220 East 75th Street, Chicago, in the county of Cook and State of Illinois, have invented a new and useful Improvement in Car Dumpers, of which the following is a specification.

This invention relates to improvements in car dumpers and more particularly to that form of car dumper embodying a rotatable cage adapted to contain a car or cars and dump the same by rotation. In this form of car dumper, the rotation may be either continuous in one direction or partial with a return rotation.

I have here shown the invention as embodied in a car dumper adapted to contain a single car for dumping. It is obvious, however, that the cage may be longer to hold two or more cars. In the device as here shown, the car in the cage being dumped, remains coupled to the other cars in the train or trip, the rotation of the car to be dumped being permitted by swivel couplings. Such swivel couplings are old in the art and consequently are not shown by me in detail. In the drawings, I have not shown any means for rotating the cage to cause the dumping of the car, since such means are old in the art and form no part of the present invention.

One of the principal objects of my invention is the prevention of injury to the supporting trunnions, supporting beams, driving mechanism, etc., by the falling coal or other material dumped. This feature will be explained more fully and further commented upon as I proceed with my specification.

Other features and advantages of my invention will appear more fully as I proceed with my specification.

In that form of device embodying the features of my invention shown in the drawings, Figure 1 is a view in side elevation of a car dumper, and Figure 2 is a view taken as indicated by the line 2 of Fig. 1.

As shown in the drawings, there is a cylindrical cage formed of the two end ring rails 9, 9ª, which are suitably joined and braced by means of the beams 11, 11, in order to form a rigid cylindrical structure. The cylindrical cage carries two rails 10, 10 forming a track section adapted to hold a car to be dumped.

Any means may be provided for retaining the car to be dumped on the track 10 during the dumping operation. As an example of such means, I have here shown the car 12 provided with angle irons 13 adapted to slip under the angle irons 84 carried by the cage to hold the car on the track as the cage rotates.

As has been stated, the invention is particularly designed for use in connection with rotatable car dumpers, where the car or cars are dumped without uncoupling. As shown in the drawings, 14 indicates a stationary approach track leading to the dump and 15, a stationary receiving track leading from the dump. It is to be particularly noted that the track 10 in the cage is considerably shorter than the cage itself. The approach track 14 extends through the end ring rail 9 and into the cage as indicated by 14ª. Likewise the receiving track 15 extends through the ring rail 9ª and into the cage as indicated by 15ª. 17 indicates a car on the approach track coupled to the car 12, and 18 indicates a car which has just been dumped and now standing on the receiving track 15 but still coupled to the car 12. The swivel couplings are indicated by 19 and 20 respectively. These couplings are so constructed that the car 12 may be rotated to dump the same without uncoupling it from the cars 17 or 18.

With the construction as shown, the length of the cage, that is, the distance between the ring rails 9 and 9ª, may be considerably longer than the distance between the couplings 19 and 20. In other words, by letting the approach and receiving tracks extend through the ring rails into the cage, the cage may be lengthened. This is a great advantage. When the cage is thus lengthened, the supporting wheels 90 and 90ª are likewise put farther apart and consequently further removed from the danger of being struck by coal or other material falling from the car 12 when it is being dumped. In other words, the further that the ring rails 9 and 9ª are separated, the greater is the clear spillageway obtained. Lengthening of the cage in this manner is of greatest importance, of course, when the cars are dumped in train by the use of swivel couplings. By allowing the approach and receiving tracks to enter the cage, and thus lengthening the cage, it is possible to get a satisfactory distance between the ring rails and a sufficient spillageway. If the spillageway is cut down, the coal or other material being dumped, will pile out through the ring rails causing injury to the supporting trunnions, driving mechanism, and the like. In addition to this, it is very difficult to provide satisfactory hoppers for catching coal falling outside of the ring rails.

If the ends 14$^a$ and 15$^a$ of the approach and receiving tracks did not extend into the cage and have their ends adjacent the track 10, the track 10 would have to be lengthened until its ends were adjacent the ends 14$^a$ and 15$^a$. If the ends 14$^a$ and 15$^a$ terminated at the ring rails 9 and 9$^a$, then the section 10 would have to extend to the ring rails. If it did this, however, it would strike the bodies of the cars 17 and 18 upon rotation of the cage.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A device of the character described comprising; a rotatable cage; a track in the cage adapted to hold a car to be dumped; a stationary approach track leading to the cage; a stationary receiving track leading from the cage; the approach and receiving tracks extending into the cage and having their ends adjacent the track in the cage.

2. A device of the character described comprising; a cylindrical rotatable cage; a track in the cage adapted to hold a car to be dumped; a stationary approach track leading to the cage; a stationary receiving track leading from the cage; the approach and receiving tracks extending into the cage and having their ends adjacent the track in the cage.

3. A device of the character described comprising; a rotatable cage having a ring rail at each end; a track in the cage adapted to hold a car to be dumped; a stationary approach track leading to the cage; a stationary receiving track leading from the cage; the approach and receiving tracks extending through the ring rails into the cage and having their ends adjacent the track in the cage.

4. A device of the character described comprising; a rotatable cage adapted to dump a car in train; a ring rail at each end of the cage; a track in the cage adapted to hold a car to be dumped, said track being shorter than the distance between the two ring rails; a stationary approach track leading to the cage at one end, extending through the ring rail, and having its end adjacent one end of the track in the cage; and a stationary receiving track leading from the cage at the other end, said track extending through the ring rail and having its end adjacent the other end of the track in the cage.

Witness my hand this 19 day of March, 1924.

GEORGE N. SIMPSON.